(12) United States Patent
Jennings et al.

(10) Patent No.: US 11,348,425 B2
(45) Date of Patent: May 31, 2022

(54) SYSTEMS AND METHODS FOR MONITORING ADVERTISEMENTS

(71) Applicant: Outdoorlink, Inc., Huntsville, AL (US)

(72) Inventors: Dwight Jennings, Huntsville, AL (US); James F. Morris, Huntsville, AL (US); Richard Holloway, Huntsville, AL (US)

(73) Assignee: Outdoorlink, Inc., Huntsville, AL (US)

( * ) Notice: Subject to any disclaimer, the term of this patent is extended or adjusted under 35 U.S.C. 154(b) by 0 days.

(21) Appl. No.: 16/739,364

(22) Filed: Jan. 10, 2020

(65) Prior Publication Data

US 2020/0152032 A1 May 14, 2020

Related U.S. Application Data

(63) Continuation of application No. 15/202,359, filed on Jul. 5, 2016, now Pat. No. 10,593,175, which is a continuation-in-part of application No. 14/321,512, filed on Jul. 1, 2014, now Pat. No. 10,185,969.

(60) Provisional application No. 61/841,714, filed on Jul. 1, 2013.

(51) Int. Cl.
*G06Q 30/00* (2012.01)
*G08B 13/196* (2006.01)
*H04N 7/18* (2006.01)
*G06V 20/52* (2022.01)

(52) U.S. Cl.
CPC ....... *G08B 13/19695* (2013.01); *G06V 20/52* (2022.01); *G08B 13/19613* (2013.01); *G08B 13/19641* (2013.01); *G08B 13/19656* (2013.01); *H04N 7/181* (2013.01); *G08B 13/19628* (2013.01)

(58) Field of Classification Search
CPC .......... H04N 5/268; H04N 7/00; H04N 7/181; G06V 20/52
See application file for complete search history.

(56) References Cited

U.S. PATENT DOCUMENTS

| | | | |
|---|---|---|---|
| 5,786,760 A * | 7/1998 | Suzuki | G08B 15/002 340/384.3 |
| 8,544,033 B1 | 9/2013 | Acharya | |
| 8,818,101 B1 | 8/2014 | Lim | |

(Continued)

OTHER PUBLICATIONS

Yousefi, Ali et al. ,"Aggregating Seismic, Acoustic and Vibration Sensor Outputs for Enhancing Threat Detection Performance and Estimating Threat-Level", Dec. 2011, University of Southern California, IEEE article, pp. 202-203 (Year: 2011).*

(Continued)

*Primary Examiner* — Alvin L Brown
(74) *Attorney, Agent, or Firm* — Maynard Cooper & Gale, P. C.; Jon E. Holland

(57) ABSTRACT

A system for monitoring advertisements has a security camera and sensor that are positioned to monitor an area surrounding the advertising structure with the advertisement. The camera and sensor can be controlled by a control module. The control module can activate the camera in response to receiving a signal from the sensor indicating activity in the area surrounding the advertising structure. The camera can capture images of the area surrounding the advertising structure and provide the images to the control module. The control module can then provide the images to a server for access by a user.

30 Claims, 9 Drawing Sheets

(56) References Cited

U.S. PATENT DOCUMENTS

| | | | |
|---|---|---|---|
| 10,185,969 B1 | 1/2019 | Holloway et al. | |
| 2001/0014872 A1 | 8/2001 | Hunter | |
| 2003/0126013 A1* | 7/2003 | Shand | G06Q 30/0269 |
| | | | 705/14.52 |
| 2003/0146891 A1 | 8/2003 | Poliakine | |
| 2004/0174597 A1 | 9/2004 | Craig | |
| 2007/0124157 A1 | 5/2007 | Laumeyer | |
| 2007/0271585 A1 | 11/2007 | Taguchi | |
| 2008/0120181 A1* | 5/2008 | Chang | G06Q 30/0267 |
| | | | 705/14.61 |
| 2009/0257620 A1 | 10/2009 | Hicks | |
| 2009/0319231 A1 | 12/2009 | Beland | |
| 2010/0153218 A1 | 6/2010 | Wilson | |
| 2012/0127324 A1 | 5/2012 | Dickins | |
| 2013/0208109 A1 | 8/2013 | Landry | |
| 2013/0307975 A1 | 11/2013 | Ford | |
| 2014/0152786 A1 | 6/2014 | Nicholson | |
| 2014/0252958 A1 | 9/2014 | Subotnick et al. | |
| 2014/0267896 A1* | 9/2014 | Cox | H04N 5/63 |
| | | | 348/383 |
| 2016/0094793 A1 | 5/2016 | Westmarcott | |

OTHER PUBLICATIONS

Excite Billboard Installation Instructions for 20mm and 23mm Pitch series signs (Published on Mar. 19, 2008).

* cited by examiner

SYSTEMS AND METHODS FOR MONITORING ADVERTISEMENTS

CROSS REFERENCE TO RELATED APPLICATIONS

This application is a continuation of U.S. patent application Ser. No. 15/202,359, entitled "Systems and Methods for Monitoring Advertisements" and filed on Jul. 5, 2016, which is incorporated herein by reference. U.S. patent application Ser. No. 15/202,359 is a continuation-in-part of U.S. patent application Ser. No. 14/321,512, entitled "Systems and Methods for Monitoring Advertisements" and filed on Jul. 1, 2014, which is incorporated herein by reference. U.S. patent application Ser. No. 14/321,512 claims the benefit of U.S. Provisional Patent Application No. 61/841,714, entitled "Systems and Methods for Monitoring Advertisements" and filed on Jul. 1, 2013, which is incorporated herein by reference.

RELATED ART

Many product or service providers, referred to herein as "advertising consumers," spend significant monetary resources for outdoor advertising, such as roadside billboards. Typically, an advertising consumer will contract with an outdoor advertising agency to display an advertisement for a certain time period, referred to hereafter as an "ad term," such as a number of weeks or months. The advertising consumer often desires to receive assurance that the outdoor advertising agency has complied with the terms of the contract. Specifically, the advertising consumer often wants to ensure that the advertisement is displayed in good condition for the duration of the ad term.

Accordingly, the advertising agency often sends an employee or agent to the location of the advertisement for capturing images of the advertisement on one or more dates during the ad term. The advertising agency then provides the captured images to the advertising consumer as evidence that the advertisement has been appropriately displayed during the ad term. However, between the times of image capture, there is often little or no real assurance that the advertisement is appropriately displayed. If the advertisement is damaged or altered due to weather, vandalism or some other event or problem, the damage or alteration may not be discovered for an extended period of time. Some advertising consumers may choose to visit the premises of the advertisement from time-to-time in order to verify that the advertisement is appropriately displayed during the ad term. However, such verification can be burdensome and costly, particularly for an advertising consumer with a large number of advertisements. Further, even if an advertising consumer checks the advertisement from time-to-time, it is still possible for a problem with the advertisement to exist for an extended period of time before detection.

In addition, many advertisements can be placed on billboards located in remote areas. The remotely located billboards may be accessed by unauthorized persons in order to vandalize the billboard or for other illegal activities. Due to the remote location of the billboard, the advertising company is often unable to prevent a person from engaging in an illegal activity at the billboard and has no means to identify the person(s) who engaged in the illegal activity. Further, even if an unauthorized person accesses the billboard for a non-malicious reason, the advertising company can still have safety and/or liability concerns associated with the unauthorized person's access to the billboard.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for monitoring advertisements. In one exemplary embodiment, a camera is mounted on or near an advertisement and is positioned to capture an image of the advertisement. The camera is coupled to a control module that controls operation of the camera and wirelessly transmits data defining the camera's images to a server, which stores such data. At any time, a user may contact the server to view images of the advertisement captured by the camera in order to verify the condition of the advertisement. The control module is configured to control the camera in order to automatically capture images at certain times, such as the start and end of an ad term, as well as from time-to-time during the ad term. The system also permits images of the advertisement to be captured on demand. That is, a user may initiate an image capture event from a remote location to view the current state of the advertisement in real time without actually traveling to the location of the advertisement.

In another exemplary embodiment, the system can also include security cameras and sensors to monitor the area surrounding the advertisement. The security cameras and sensors can be coupled to and controlled by the control module. The sensors can be mounted on or near the advertisement to detect activity, e.g., movement by unauthorized people, around the advertisement and the security cameras can be mounted on or near the advertisement to record the activity detected by the sensors. The control module can control the operation of the sensors and security cameras and can automatically activate the security cameras based on signals provided by the sensors. The control module can receive the captured images from the security cameras and wirelessly transmit the data defining the camera's images to the server for storage. The server can notify the user that the sensors have detected activity occurring at the advertisement. The message from the server may provide the user with captured images of those activities or the user may have to contact the server to view the captured images. After viewing the activity in the captured images, the user can determine if the activity occurring at the advertisement is an intruder event that requires further action such as deactivating the lights at the advertisement or the advertisement itself, if the advertisement is an electronic advertisement. In addition, warning devices such as a lights, sirens, alarms or speakers can be activated by either the control module or the user based on the signals from the sensors and/or the images from the security cameras to discourage the continuation of the activities detected by the sensor by attempting to frighten away the people or animals that are triggering the sensors.

Figure 1:
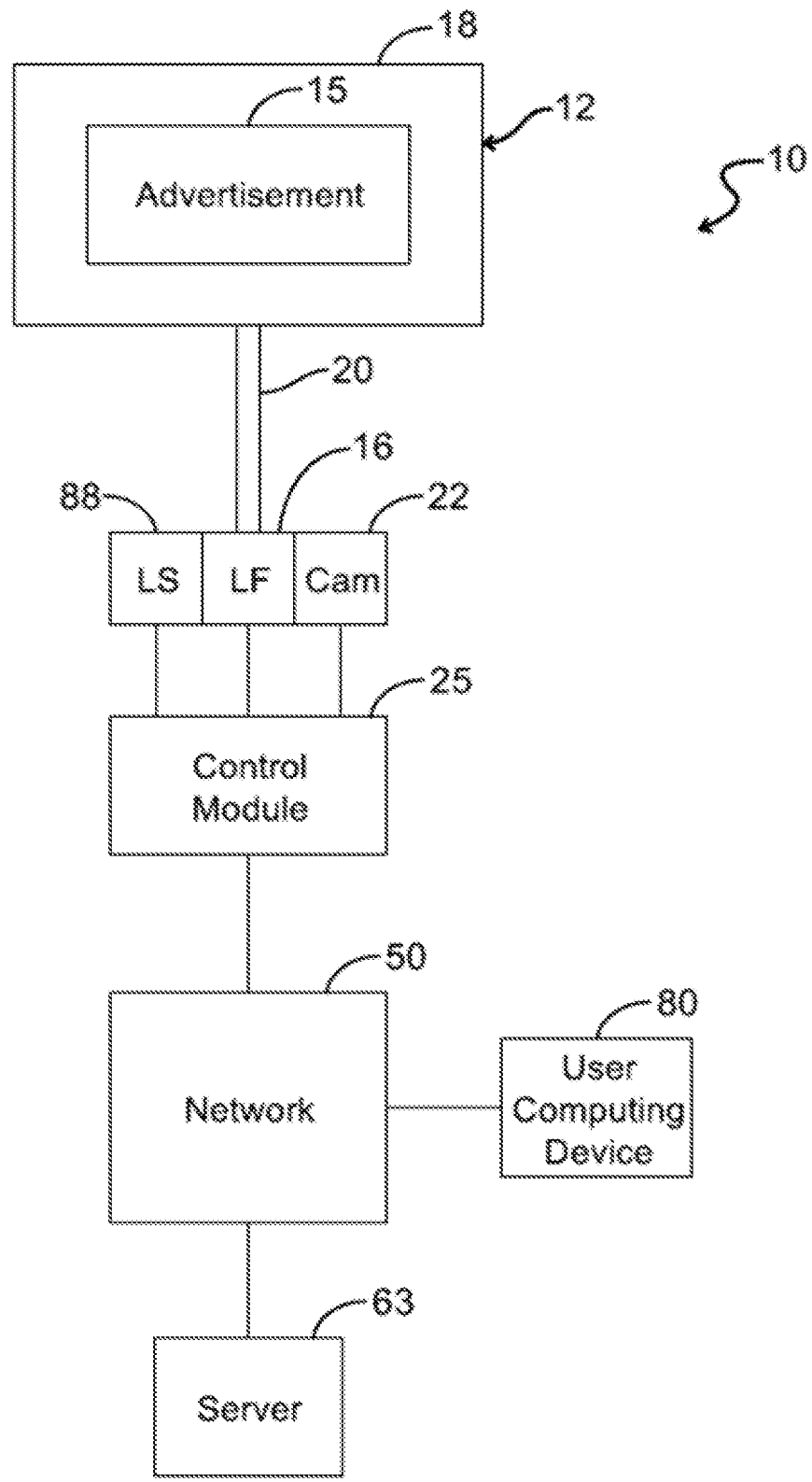
FIG. 1 is a block diagram illustrating an exemplary embodiment of a system for monitoring advertisements.
Figure 2:
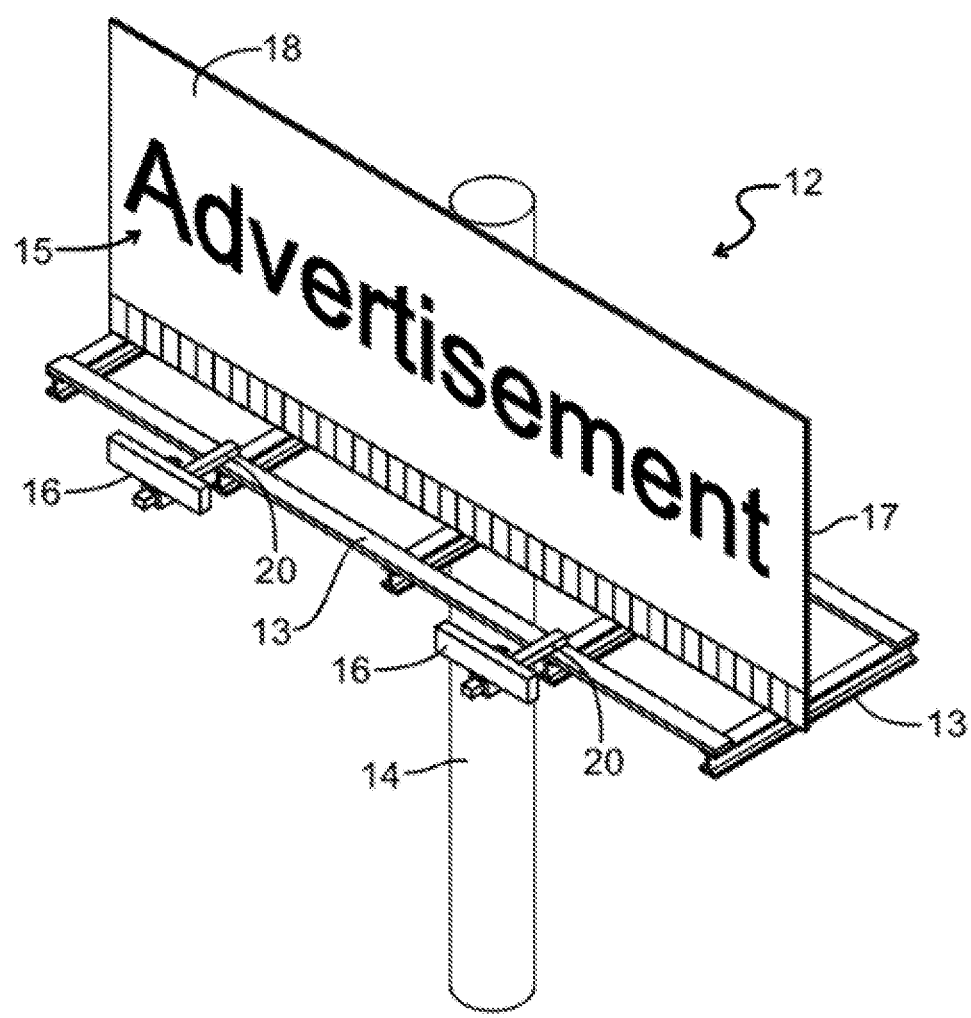
FIG. 2 is a perspective view illustrating an exemplary embodiment of an advertising system, such as is depicted by FIG. 1.

FIG. 1 depicts an exemplary embodiment of an advertisement monitoring system 10. As shown by FIG. 1, the system 10 comprises an advertising structure 12 for supporting an advertisement 15 and at least one lighting fixture (LF) 16 having a light source (not specifically shown in FIG. 1) for illuminating the advertisement 15. In one exemplary embodiment, the advertising structure 12 comprises a roadside billboard 18 that is positioned near a street so that occupants of vehicles traveling along the street can view the advertisement 15, which is positioned on or displayed from the billboard 18. As shown by FIG. 2, the billboard 18 includes a frame 13 for supporting a panel 17 on which the advertisement 15 is positioned, and the frame 13 is mounted on a pole 14 so that the frame 13 is suspended some distance from the ground. However, in other embodiments, other types of advertisements are possible, including indoor advertisements. For illustrative purposes, it will be assumed hereafter that the advertising structure 12 comprises a roadside billboard, but it should be emphasized that the techniques described herein for monitoring the advertisement 15 on the structure 12 can be used to monitor other types of advertisements and advertising structures. Exemplary advertising monitoring systems are disclosed in U.S. patent application Ser. No. 14/321,512, entitled "Systems and Methods for Monitoring Advertisements" and filed on Jul. 1, 2014, which application is hereby incorporated by reference.

As described above, an advertisement 15 may be positioned on the billboard 18, and the advertisement 15 may comprise vinyl or some other material on which advertising content is printed or otherwise formed. In another exemplary embodiment, the advertisement 15 is electronic. In such an embodiment, the billboard 18 comprises light sources (not shown), such as light emitting diodes (LEDs), that are illuminated in order to display an electronic message and/or graphic.

The lighting fixture 16 is mounted on an arm 20 that is coupled to and extends from the frame 13. A camera (cam) 22 is mounted on the arm 20 as well. As an example, the camera 22 can be mounted directly on the arm 20, or the camera 22 can be mounted on the lighting fixture 16 that is coupled to the arm 20. In one exemplary embodiment, a bracket (not shown) is used to mount the camera 22 on the lighting fixture 16, but other techniques for mounting the camera 22 are possible. For example, the camera 22 may be mounted on a separate arm (not shown) extending from the billboard 18, or it is possible to position the camera at a location that does not require it to be mounted on the structure 12 at all. As an example, the camera 22 may be mounted on a pole (not shown) or other structure that is inserted into or positioned on the ground some distance away from the structure 12 so that the advertisement 15 is in view of the camera without the camera being coupled to the structure 12. In one embodiment where the camera 22 is mounted on the lighting fixture 16, the arm 20 extends just a few feet from the billboard 18, and the camera 22 is, therefore, positioned close to the billboard 18, such as about five to six feet away, but other distances are possible in other embodiments.

Figure 3:
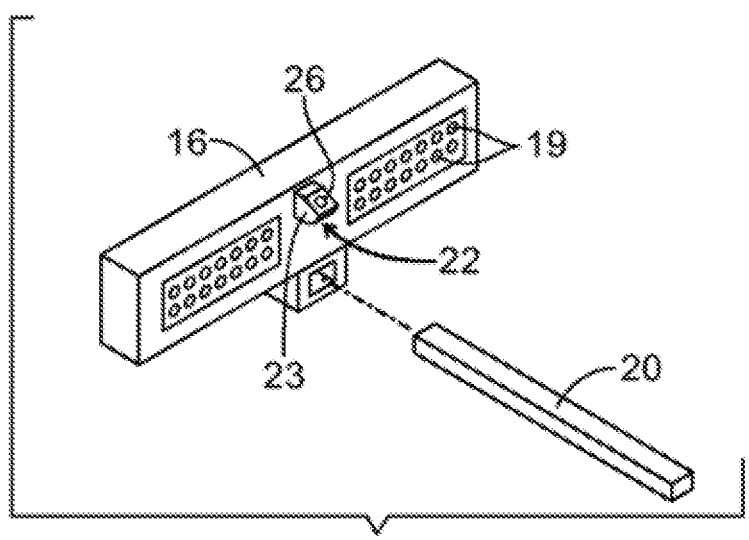
FIG. 3 is a perspective view illustrating an exemplary embodiment of a lighting fixture, such as is depicted by FIG. 2, having a camera mounted on the lighting fixture.
Figure 4:
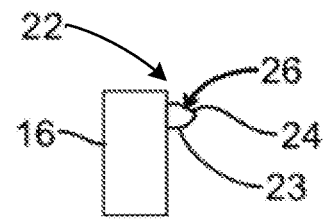
FIG. 4 is a side view illustrating a lighting fixture and camera, such as is depicted by FIG. 3.

FIG. 3 shows an exemplary embodiment of a lighting fixture 16 when the camera is mounted on a side of the lighting fixture 16 that faces the advertisement 15. As shown by FIG. 3, the lighting fixture 16 has a plurality of light sources 19, such as light emitting diodes or incandescent bulbs, for illuminating the advertisement 15. As shown by FIGS. 3 and 4, the camera 22 has a housing 23 that protrudes from a surface of the lighting fixture 16. The housing 23 has an angled surface 24 on which a lens 26 of the camera 22 is positioned. The surface 24 is angled relative to horizontal so that the lens 26 is directed toward the advertisement, and at least a portion of the advertisement 15 is in view of the lens 26. Moreover, the lens 26 is positioned for viewing the advertisement 15 so that the camera 22 may capture an image of the advertisement 15 as may be desired. Preferably, the camera 22 captures digital images that can be readily transmitted electronically, as will be described in more detail hereafter.

Figure 5:
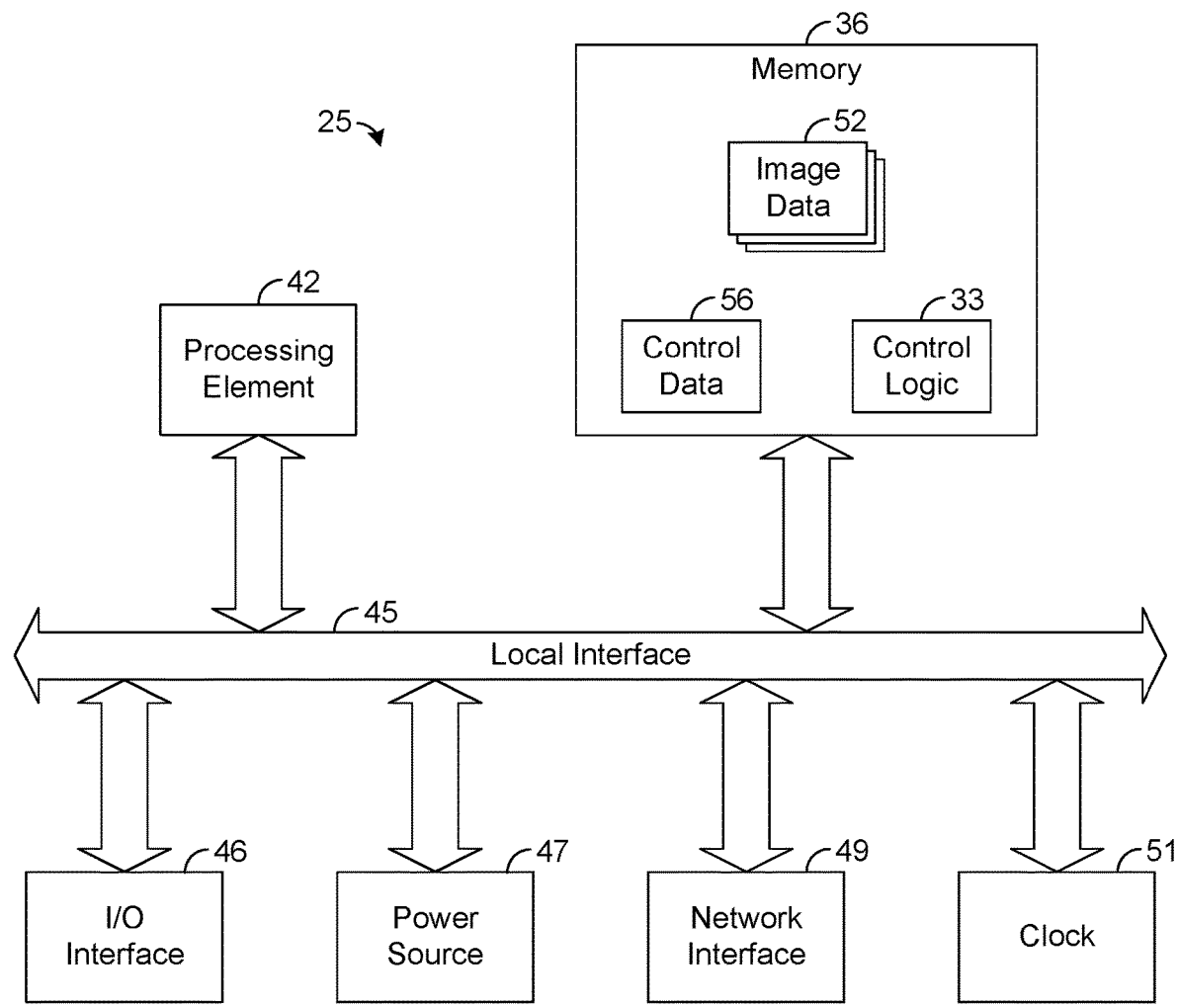
FIG. 5 is a block diagram illustrating an exemplary embodiment of a control module, such as is depicted by FIG. 1.

As shown by FIG. 1, the lighting fixture 16 and camera 22 are coupled to a control module 25 that is configured to control and/or monitor the light sources 19 of the lighting fixture 16 and/or the camera 22. FIG. 5 depicts an exemplary embodiment of the control module 25. As shown by FIG. 5, the control module 25 comprises control logic 33 for generally controlling the operation of the module 25, as will be described in more detail hereafter. The control logic 33 can be implemented in software, hardware, firmware or any combination thereof. In the exemplary module 25 illustrated by FIG. 5, the control logic 33 is implemented in software and stored in memory 36.

Note that the control logic 33, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary module 25 depicted by FIG. 5 comprises at least one conventional processing element 42, such as a digital signal processor (DSP) or a central processing unit (CPU), that communicates to and drives the other elements within the module 25 via a local interface 45, which can include at least one bus. As an example, when the control logic 33 is implemented in software, the processing element 42 is configured to execute instructions of such software. The module 25 also comprises an input/output (I/O) interface 46 for receiving inputs and providing outputs as may be desired. A power source 47, such as a battery, provides electrical power for the various components of the module 25, and a network transceiver 49 is configured to communicate with a network 50 (FIG. 1). The control module 25 also has a clock 51.

Preferably, the contents of the module 25 are housed within an environmentally-hardened housing that is sealed in order to prevent water from reaching the electrical components of the module 25. Environmentally-hardened housings are generally well known and will not be described in detail herein. In one embodiment, the control module 25 is mounted on the structure 12 (e.g., coupled to the billboard 18), but other locations of the control module 25 are possible in other embodiments.

Figure 11:
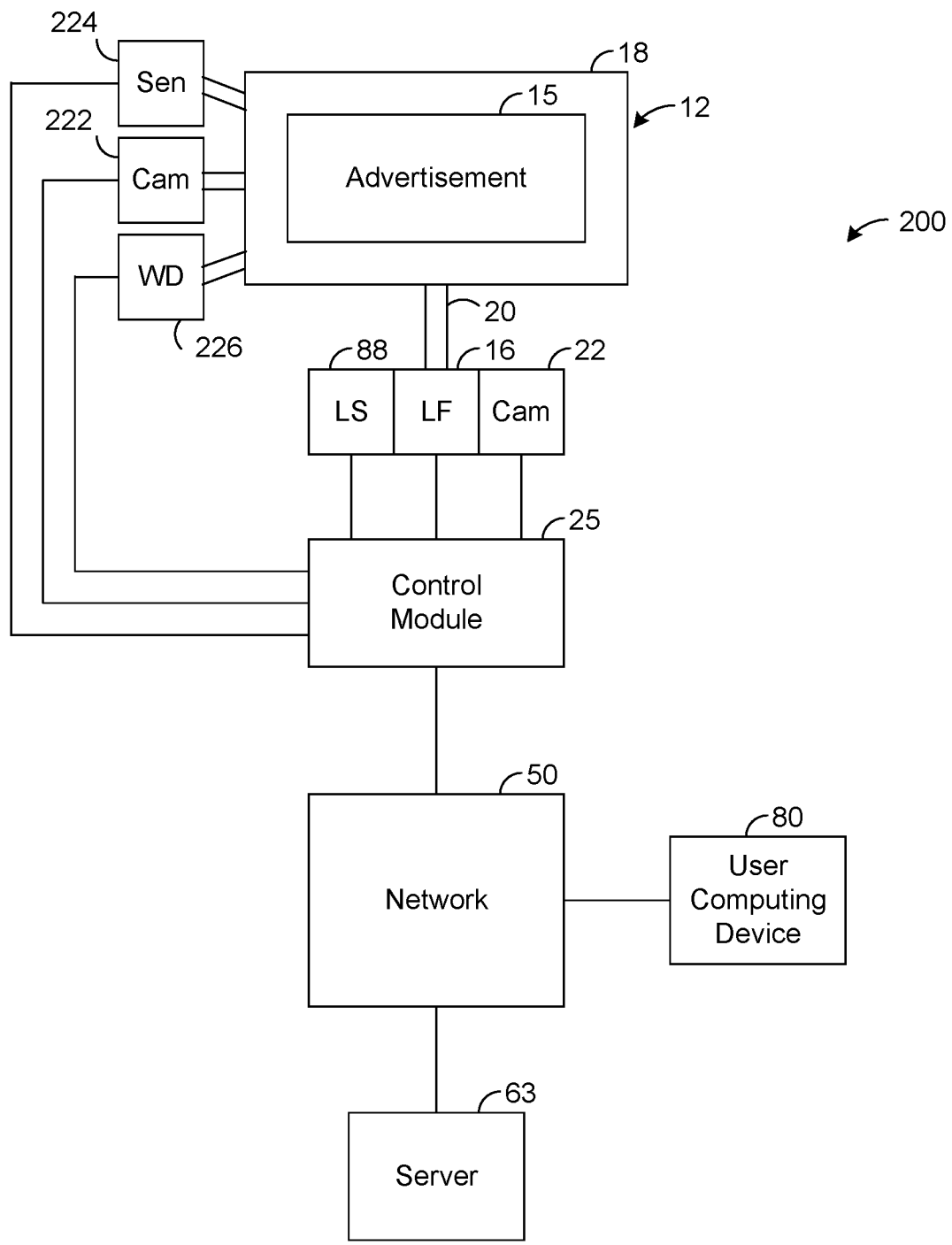
FIG. 11 is a block diagram illustrating an exemplary embodiment of a system for monitoring advertisements.

The memory 36 stores sets (e.g., files) of image data 52. Each set of image data 52 defines an image captured by the camera 22 (FIG. 1) and/or camera 222 (FIG. 11). The memory 36 also stores control data 56 indicating predefined times when images of the advertisement 15 are to be captured. As an example, an advertising consumer may purchase an ad term for displaying an advertisement 15. The control data 56 may indicate that an image of the advertisement 15 is to be captured at the start of the ad term, at the end of the ad term, and at other predefined times between the beginning and end of the ad term. In other embodiments, other times may be indicated by the data 56. Based on such data 56 and the clock 51, the control logic 33 is configured to control the camera 22 such that images of the advertisement 15 are captured by the camera 22 at the indicated times. For each captured image, the control logic 33 stores a set of image data 52 defining the image, and the control logic 33 timestamps the set of image data 52 to indicate, based on the clock 51, the time when the image is captured.

When desired, the control logic 33 is configured to transmit one or more of the sets of image data 52 via the network transceiver 49 and the network 50 (FIG. 1) to a server 63 (FIG. 1). The network 50 may comprise any number and types of communication networks, such as a local area network (LAN) and/or a wide area network (WAN). In one exemplary embodiment, the network transceiver 49 is a cellular transceiver that communicates via a cellular network and the Internet to the server 63. In such embodiments, the messages communicated by the control module 25 may be in accordance with transmission control protocol/Internet protocol (TCP/IP) or other suitable protocols.

Note that any set of image data 52 may be discarded (e.g., overwritten or erased) from the memory 36 once it is transmitted to the server 63. It is unnecessary for the module 25 to maintain persistent storage of the image data 52.

For simplicity, FIG. 1 shows a single advertisement 15 and control module 25, but the system 10 may have any number of advertisements and control modules in other embodiments. The server 63 may be configured to communicate with any number of control modules for monitoring any number of advertisements according to the techniques described herein.

Figure 6:
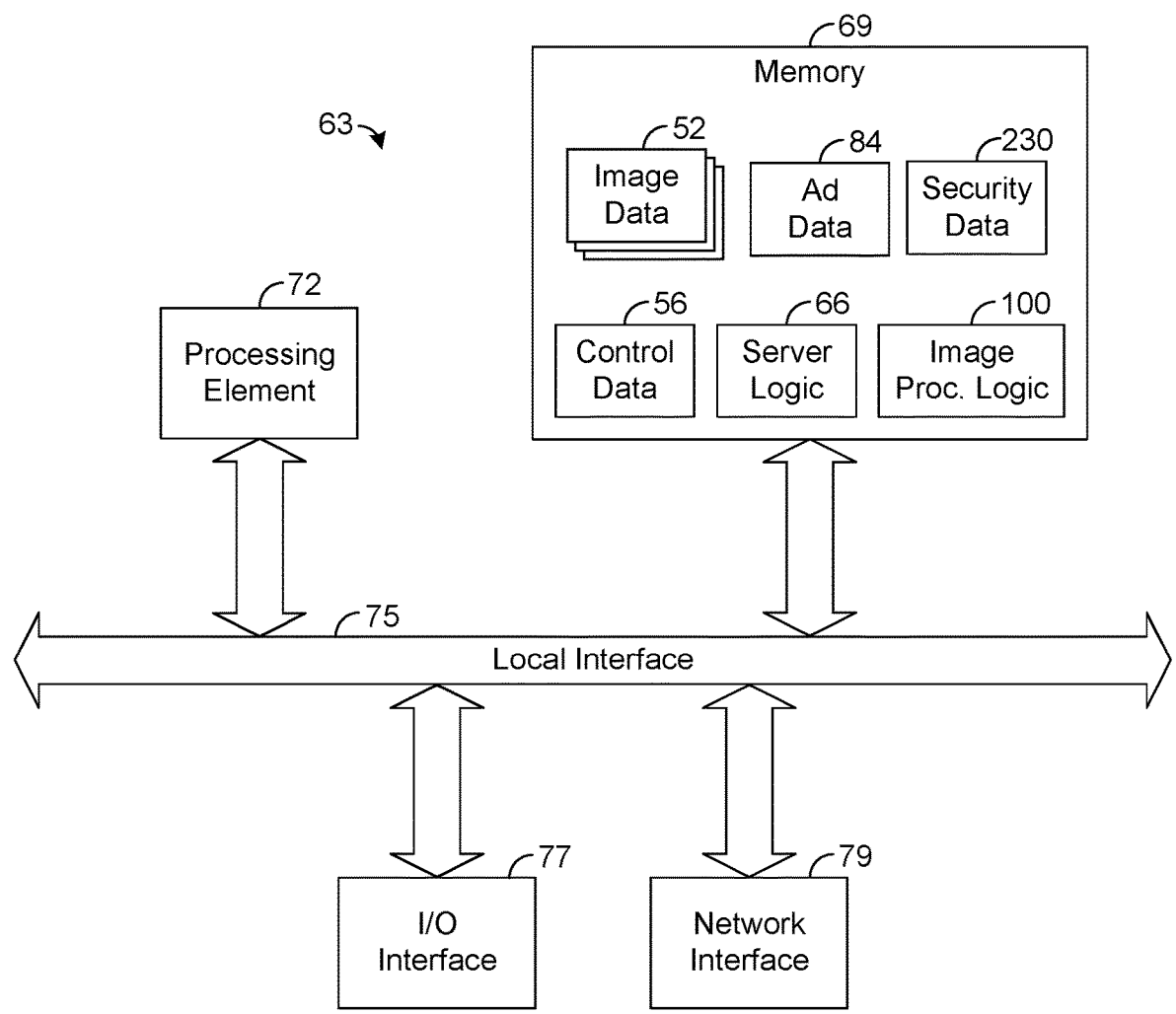
FIG. 6 is a block diagram illustrating an exemplary embodiment of a server, such as is depicted by FIG. 1.

FIG. 6 depicts an exemplary embodiment of the server 63. As shown by FIG. 6, the server 63 comprises server logic 66 for generally controlling the operation of the server 63, as will be described in more detail hereafter. The server logic 66 can be implemented in software, hardware, firmware or any combination thereof. In the exemplary server 63 illustrated by FIG. 6, the server logic 66 is implemented in software and stored in memory 69. Note that the server logic 66, when implemented in software, can be stored and transported on any computer-readable medium for use by or in connection with an instruction execution apparatus that can fetch and execute instructions.

The exemplary server 63 depicted by FIG. 6 comprises at least one conventional processing element 72, such as a central processing unit (CPU), that communicates to and drives the other elements within the server 63 via a local interface 75, which can include at least one bus. As an example, when the server logic 66 is implemented in software, the processing element 72 is configured to execute instructions of such software. The server 63 also comprises an input/output (I/O) interface 77 for receiving inputs and providing outputs as may be desired. A network transceiver 79 (e.g., Ethernet adapter) is configured to communicate with the network 50 (FIG. 1).

Inputs defining the control data 56 may be received via the I/O interface 77 or otherwise. As an example, a user of an advertising agency may provide inputs specifying the beginning and end times of an ad term purchased by an advertising consumer. The server logic 66 is configured to download the control data 56 to the control module 25 via the network 50. In addition, the server logic 66 is configured to store in memory 69 the sets of image data 52 received from the control module 25. As an example, the sets of image data 52 may be stored on a hard drive or other type of memory where the sets of image data 52 may be persistently maintained. When desired, the sets of image data 52 may be accessed by a local or remote user via the I/O interface 77 and/or a user computing device 80 (FIG. 1), such as a desktop, laptop, or handheld computer, a cellular telephone, or other type of device capable of communicating via a network.

In one exemplary embodiment, the advertisement 15 is associated with an identifier, referred to herein as "ad identifier," that identifies the advertisement 15 relative to other advertisements monitored by the system 10. In addition, each control module 25 is associated with an identifier, referred to herein as "module identifier," that identifies such module 25 relative to other control modules 25 in the system 10. In one exemplary embodiment, the network transceiver 49 is cellular transceiver, and the module identifier is the electronic serial number (ESN) that is assigned to the network transceiver 49 as its identifier in the cellular network. In other embodiments, other types of module identifiers may be used. Further, as shown by FIG. 6, the server 63 stores ad data 84 that correlates the ad identifiers and the module identifiers. Specifically, the ad data 84 correlates the module identifier for a given control module 25 with the ad identifier of the advertisement 15 for which the control module 25 receives captured images.

Each message transmitted to and received from a control module 25 includes the module identifier of such module 25. Thus, when the server logic 66 receives a set of image data 52 from a control module 25, the server logic 66 can correlate such set of image data 52 with the appropriate ad identifier. In this regard, using the module identifier in the received message, the server logic 66 looks up the correlated ad identifier in the ad data 84 and associates this ad identifier with the set of image data 52. Thus, when sets of images of multiple advertisements are stored in memory 69 at the server 63 or other location, the ad identifiers associated with the image data 52 can be used to find images of an advertisement of interest. In particular, the advertisement's ad identifier can be used as a key to lookup the set or sets of image data 52 pertaining to a particular advertisement of interest.

If the user of the computing device 80 desires to view one or more images of the advertisement 15 depicted by FIG. 1, the user may establish a communication session with the server 63 via the network 50 and specify an ad identifier pertaining to the advertisement 15 of interest. Based on such identifier, the server logic 66 is configured to retrieve at least one set of image data 52 for the advertisement 15 and to transmit the set of image data 52 to the computing device 80, which may then render the set of image data 52 to the user. As an example, based on the ad identifiers and timestamps, the server logic 66 may retrieve and transmit the most recent set of image data 52 associated with the identified advertisement 15. Alternatively, the server logic 66 may transmit a plurality (e.g., all) of the sets of image data 52 associated with identified advertisement. In yet another embodiment, the user may provide inputs to specify which set or sets of image data 52 are to be retrieved and transmitted. Based on the timestamps in the image data 52, the time of capture for each image may also be displayed so that the user is informed of when each displayed image was captured by the system 10.

In one exemplary embodiment, when the user is requesting retrieval of image data 52, the user provides input for specifying a time period of interest, such as specifying a beginning time and ending time of the time period or just a predefined period, such as within the last 24 hours or 1 week. The server logic 66 then searches for and retrieves the sets of image data 52 captured during the identified time period. In this regard, the server logic 66 finds sets of image data 52 having timestamps within the identified time period and transmits such sets of image data 52 to the computing device 80 for viewing by the user. In other embodiments, other techniques for monitoring the image data 52 and providing sets of image data 52 to the user are possible.

Note that the ad data 84 may indicate various attributes about the advertisements 15 monitored by the system 10 in addition to correlating identifiers. As an example, for each advertisement 15, the ad data 84 may indicate various information, such as the name and contact information of the advertising consumer who purchased the advertisement, the times of the ad term, the amount paid for the advertisement 15, and other information that may be of interest to the advertising consumer and/or the advertising agency associated with the advertisement 15. The ad data 84 may be stored in a database for which the server logic 66 can query in order to discover attributes about an advertisement 15 being monitored.

In one exemplary embodiment, the server logic 66 uses the ad data 84 in order define at least a portion of the control data 56. Specifically, for each advertisement 15, the server logic 66 is configured to consult the ad data 84 in order to determine the beginning and ending times of the ad term for the advertisement 15. Based on such times, the server logic 66 automatically schedules via the control data 56 an image capture event at the beginning of the ad term and another image capture event at the end of the ad term. Thus, an image of the advertisement 15 is automatically captured and stored at the beginning of the ad term, and another image of the advertisement 15 is automatically captured and stored at the end of the ad term. As described above, additional image capture events can be scheduled based on the ad data 84 or otherwise.

In addition, the system 10 preferably permits the user to request image capture events on demand. For example, assume that the user wishes to check the status of the advertisement 15. In such case, the user may provide inputs to the device 80 for defining a request, referred to herein as an "image capture request," identifying the advertisement 15 for which the user would like to see a real-time image. The device 80 transmits such request to the server 63. Using the ad identifier in such message, the server logic 66 retrieves from the ad data 84 at least one module identifier of at least one control module 25 that is used for monitoring the identified advertisement 15 and transmits a command, referred to herein as an "image capture command," for instructing such control module 25 to perform an image capture event. In response, the control logic 33 (FIG. 5) of the foregoing control module 25 controls the camera 22 such that it captures an image of the advertisement 15, thereby defining a set of image data 52. To complete the image capture command, the control logic 33 transmits the foregoing set of image data 52 to the server 63 via the network 50.

Upon receiving such set of image data 52, the server logic 66 forwards the set of image data 52 to the user computing device 80, which renders the set of image data thereby displaying the image of the advertisement 15 captured by the camera 22. Accordingly, at any time, a user can contact the server 63 from a remote location in order to view an image of the advertisement 15 in real time thereby allowing the user to check the current status of the advertisement 15 without traveling to its actual location.

Referring to FIG. 1, the lighting fixture 16 is coupled to a lighting sensor (LS) 88 that can be used to monitor the lighting conditions of the advertisement 15. In this regard, the lighting sensor 88 is mounted on the lighting fixture 16 (although other locations of the sensor 88 are possible) and is configured to sense when the fixture's light source is on (i.e., emitting light). There are various types of sensors 88 that may be used to sense when the light source is on. As an example, the lighting sensor 88 may be a current or power sensor that senses when current is flowing through at least one light source 19. If the sensor 88 determines that at least a threshold amount of current or power is flowing through the light source 19, then it can be assumed that the light source 19 is on and, therefore, actively emitting light. In another example, the lighting sensor 88 may be configured to sense light intensity. If the sensed intensity exceeds a predefined threshold, then it can be assumed that at least one light source 19 is on. In other embodiments, other types of sensors may be used to determine whether at least one light source 19 is on.

The control logic 33 is configured to determine when at least one light source 19 held by the fixture 16 should be on during normal operation and, during such time periods, to detect a lighting anomaly if the logic 33 determines, based on the sensor 88, that the light source is in fact off. As an example, the control data 56 may define time periods that at least one light source 19 is to be on. Based on the clock 51, the control logic 33 controls the light source 19 in order to activate it during such time periods. As an example, the light source 19 may be coupled to a switch (not shown) that selectively blocks current to the light source 19. The control logic 33 may activate the light source 19 by transitioning the switch from an open state to a closed state such that current should flow through the light source 19, causing it to turn on and emit light, if it is operating correctly. However, it is possible for the light source 19 to burn out or otherwise fail such that it fails to emit light after the switch is closed.

In one exemplary embodiment, after activating at least one light source 19, the control logic 33 checks the sensor 88 to determine whether the light source 19 is, in fact, on. If not, the control logic 33 detects a lighting anomaly and transmits to the server 63 a message indicative of the anomaly. The server logic 66 is configured to then display the message, transmit the message to a predefined address, such as an email address, or otherwise communicate or process the message in order to alert a user of the detected anomaly. Thus, a user can become aware of the anomaly shortly after its occurrence and without having to travel to the location of the advertising structure 12, and the user may take corrective action, such as sending a technician to the location of the advertising structure 12 in order to replace the burned out or defective light source 19.

In another example, images captured by the camera 22 may be used to discover a burned out or defective light source 19. For example, by analyzing an image defined by the data 52, a user may notice that the advertisement is not well lit. Based on such image, the user may determine that at least one light source 19 is not properly operating and take corrective action as may be desired. In another example, the image data 52 may be automatically analyzed by the control logic 33, server logic 66, or otherwise to automatically determine when the image is not sufficiently bright and, in response, detect a lighting anomaly. Yet other techniques for detecting a burned out or defective light source 19 are possible in other embodiments.

Note that the dimensions of the advertisement 15 and/or billboard 18 can be relatively large. As an example, it is common for the height of a billboard 18 to range from about 10 feet up to about 20 feet or more and for the width of a billboard 18 to range from about 20 feet up to about 60 feet or more. Further, in some embodiments, the arm 20 to which the lighting fixture 16 and camera 22 are mounted may extend only a few feet (e.g., about 5 feet to 6 feet) from the billboard 18. In such case, the image captured by the camera 22 may be distorted due to the camera 22 being located so close to the billboard 18 with a field of view set to capture all or a significant portion of the advertisement 15. To help capture a wide area of the advertisement 15, the camera 22 preferably has a fish-eye lens (e.g., a 120 degree fish-eye lens), but the captured images may appear distorted when the camera 22 is located close to the advertisement 15.

Referring to FIG. 6, the server 63 comprises image processing logic 100 that is configured to process the image data 52 in order to compensate and correct for distortion. As an example, for a distorted image, the image processing logic 100 may reshape the image and adjust (e.g., average pixel values) in order to provide a distortion-compensated image that more resembles the actual look of the advertisement 15. Note that the image processing logic 100 may be implemented in software, hardware, firmware or any combination thereof. In the exemplary embodiment illustrated by FIG. 6, the image processing logic 100 is implemented in software and stored in memory 69. When implemented in software, the image processing logic 100 can be stored and transported on any computer-readable medium for use by or in connection with an instruction execution apparatus that can fetch and execute instructions.

Depending on the size of the advertisement, it may be desirable to use a plurality of cameras to capture images of the advertisement 15 and/or a plurality of lighting fixtures to illuminate the advertisement. As an example, FIG. 7 shows an exemplary embodiment of an advertising system 110 having an additional lighting fixture 116, camera 122, control module 125, and lighting sensor 188, which can be configured identically to the lighting fixture 16, camera 22, control module 25, and lighting sensor 88, respectively, except that the control module 125 has a different module identifier relative to the control module 25.

Figure 8:
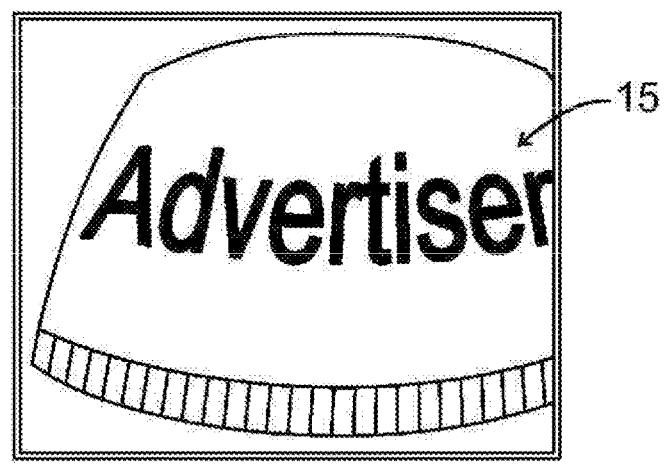
FIG. 8 illustrates an exemplary image captured by a camera of the system depicted by FIG. 7.
Figure 9:
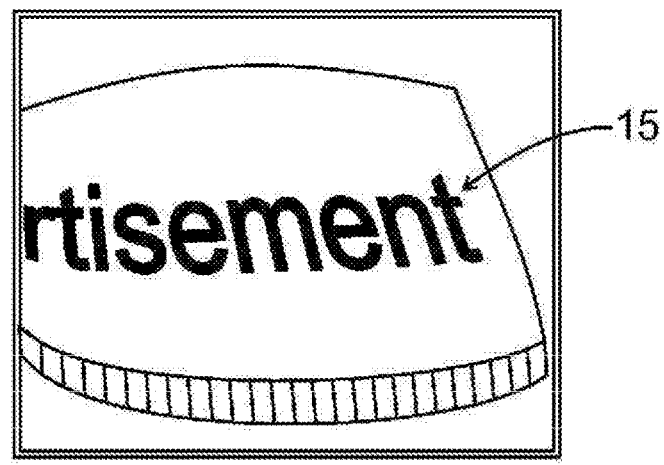
FIG. 9 illustrates an exemplary image captured by another camera of the system depicted by FIG. 7.

Each camera 22 and 122 is positioned to view a different portion of the advertisement 15, and the images from both cameras 22 and 122 are stitched together by the image processing logic 100 in order to define a single image. As an example, FIG. 8 depicts an image of an exemplary advertisement 15 captured by the camera 122, and FIG. 9 depicts an image of the same advertisement 15 captured by the camera 22. Each such image is distorted and shows only a portion of the overall advertisement 15. In this regard, the advertisement 15 in reality has a rectangular shape, but the captured images show a non-rectangular advertisement 15 having curved or warped edges due to distortion resulting from the close proximities of the cameras 22 and 122 relative to the advertisement 15. The control module 125 transmits to the server 63 a set of image data 52 defining the image captured by the camera 122, and the control module 25 transmits to the server 63 a set of image data 52 defining the image captured by the camera 22.

Figure 7:
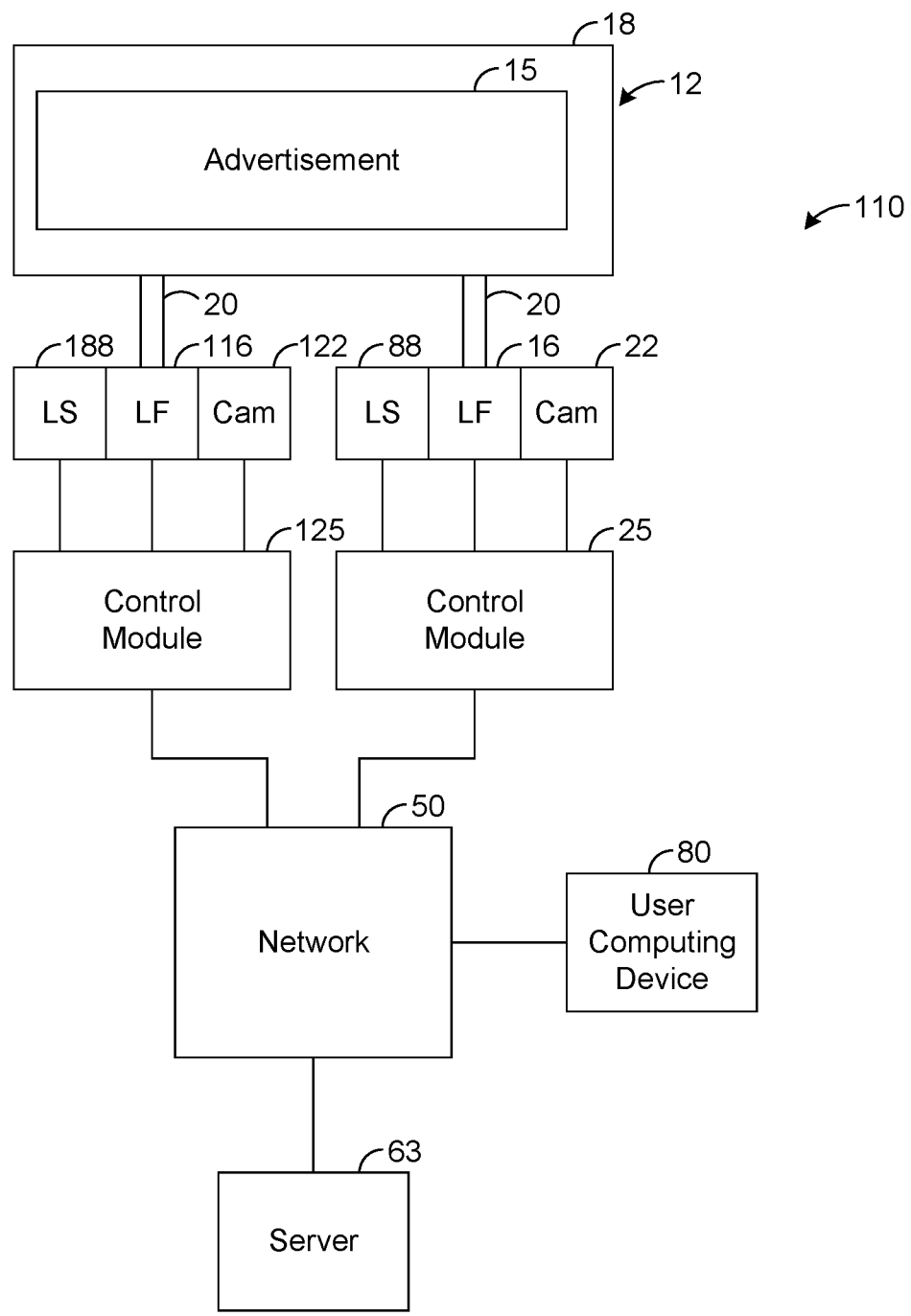
FIG. 7 is a block diagram illustrating an exemplary embodiment of a system for monitoring advertisements.

Note that when multiple cameras are used to monitor the same advertisement, as is the case for FIG. 7, the ad data 84 stored at the server 63 correlates the same ad identifier with multiple module identifiers. As an example, in the embodiment for FIG. 7, the ad data 84 correlates the ad identifier for the advertisement 15 with the module identifier of control module 25 and the module identifier of the control module 125. Based on such data 84, the server logic 66 can determine that, in order to define an image of the advertisement 15, multiple images are to be captured and stitched together.

Figure 10:
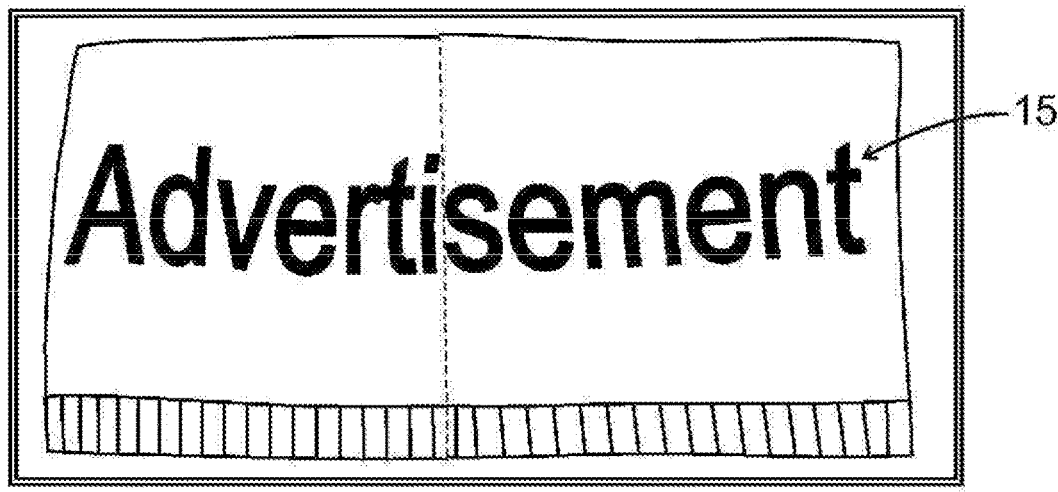
FIG. 10 illustrates an exemplary image formed by processing image data defining the images depicted by FIGS. 6 and 7.

When the server logic 66 receives the two sets of image data 52 from the control modules 25 and 125, respectively, the server logic 66 provides such sets of image data 52 to the image processing logic 100 along with instructions for combining such image data 52. In response, the image processing logic 100 is configured to correct for distortion and to stitch the two images together to define a new set of image data 52 defining a single image of the advertisement 15, as shown by FIG. 10. This new set of image data 52 may be transmitted to the user computing device 80 for viewing by a user. The processing performed by the logic 100 results in an image that more accurately represents the actual look of the advertisement 15 such that the user views a high quality image of the advertisement 15 despite the distortion introduced by the cameras 22 and 122 and the limited view of the cameras 22 and 25.

In the embodiment shown by FIG. 7, two cameras 22 and 122 are used that are controlled by two modules 25 and 125, respectively. It should be emphasized that any number of cameras may be used to capture images of the advertisement. In addition, a single control module 25 may be used to control and process data from multiple cameras. As an example, referring to FIG. 7, it is possible for the control module 25 to be used to control and process data from both cameras 22 and 122 thereby obviating the need for a second control module 125. In addition, it is possible for any of the cameras 22 and 122 to be video cameras, which provide video images of the advertisement 15. Such cameras may be particularly beneficial for advertising structures that change their advertising content frequently. As an example, an electronic advertising structure may automatically cycle through a plurality of advertisements where each advertisement is temporarily displayed for a finite period of time followed by the display of another advertisement. By using video images, a user can confirm that an advertisement 15 of interest over time is being displayed for an appropriate amount of time and frequency.

In various embodiments described above, a server 63 is used to receive image data 52 from one or more control modules 25. However, the use of a server 63 for providing image data 52 to a user is unnecessary. As an example, if desired, a control module 25 can be configured to transmit image data 52 directly to a user, such as to the user computing device 80 without the image data 52 being transmitted to the server 63.

FIG. 11 depicts an exemplary embodiment of an advertisement monitoring system 200. The advertisement monitoring system 200 is similar to the system 10 shown in FIG. 1 except the advertisement monitoring system 200 includes one or more security cameras (Cam) 222 and one or more sensors (Sen) 224 to monitor the areas surrounding the advertisement 15, advertising structure 12 and/or billboard 18.

The one or more cameras 222 can record or capture images of activities and/or events, e.g., the movement or actions of people, occurring in areas on or in the vicinity of the advertising structure 12 such as the base of the pole 14 for the advertising structure 12 or the frame 13 used to access the advertisement 15. The one or more sensors 224 can sense or determine when activities and/or events are occurring in the areas on or around the advertising structure 12 monitored by the security cameras 222. For example, a sensor 224 can be placed on or near the frame 13 of the advertising structure 12 to detect for movement on the frame 13. If the sensor 224 detects movement on the frame 13, a camera 222 positioned on or near the frame 13 can be activated to capture images of the frame 13 and associated areas to determine the source, e.g., a person, animal, bird, object, etc., of the movement that triggered the sensor 224. One or more warning devices (WD) 226 such as a light, siren, alarm or speaker can provide an alert at the advertising structure 12 to inform people attempting to access the advertising structure 12 that their activities have been detected and to encourage the people to stop their activities at the advertising structure 12 and to leave the area.

In one embodiment, the sensors 224 can be motion detectors. However, in other embodiments, the sensors 224 may include optical sensors, proximity sensors, infrared sensors, touch sensors, audio sensors, temperature sensors, pressure sensors or any other suitable type of sensor that can detect the presence of activity or people in the area of the advertising structure 12. In another embodiment, the security cameras 222 can include cameras 22 and the warning devices 226 can include lighting fixture 16 with light source 19. In still another embodiment, the cameras 222 can be image cameras with image sensors to capture images of an area. However, in other embodiments, other types of cameras, e.g., night vision cameras or infrared cameras, can also be used to be obtain images of the area. For example, an infrared camera can be used to capture thermal images.

In one embodiment, the sensor(s) 224, camera(s) 222 and warning device(s) 226 can be either mounted individually on or near the advertising structure 12 or incorporated into a single unit or structure that can be mounted on or near the advertising structure 12. In other embodiments, one or more of the sensor(s) 224, camera(s) 222 and warning device(s) 226 can be mounted on or near the advertising structure 12 as individual components, with the remaining components being mounted together as unit. For example, a sensor 224 may be mounted remotely from a camera 222 and light (warning device) 226 that may be combined as a unit in order to have the sensor 224 in an optimal position to detect activity around the advertising structure 12.

In one embodiment as shown in FIG. 11, the sensor(s) 224, camera(s) 222 and warning device(s) 226 can be coupled to and controlled by the control module 25. The connections between the control module 25 and the sensor(s) 224, camera(s) 222 and warning device(s) 226 can be either hardwired, wireless or combinations of hardwired and wireless.

In one embodiment as shown in FIG. 11, the control module 25 can be used to control the security cameras 222, sensors 224 and warning devices 226 in addition to controlling the light sources 19 of the lighting fixture 16 and the cameras 22. However, in other embodiments, a separate control module 25 for controlling the cameras 222, sensors 224 and warning devices 226 can be used. In addition, if more than one security camera 222 and sensor 224 are used, the security cameras 222 and sensors 224 can be controlled by either a single control module 25 or by a plurality of control modules 25 such that one or more security cameras 222 and sensors 224 can be controlled by an individual control module 25.

The memory 36 (see FIG. 5) of the control module 25 used with security camera 222 stores sets (e.g., files) of image data 52 (see FIG. 5). Each set of image data 52 defines an image captured by camera 222. The memory 36 also stores control data 56 (see FIG. 5) indicating when images of the area surrounding the advertising structure 12 are to be captured and when the server 63 should be notified of detected activity by sensors 224. The control data 56 can also indicate which sensors 224 are linked to which cameras 222 and which cameras 222 are linked to which sensors 224. Each camera 222 can be linked with one or more sensors 224 and each sensor 224 can be linked to one or more cameras 222 depending on the number and location of the cameras 222 and sensors 224 used at the advertising structure 12. The linkage between the sensors 224 and cameras 222 can be based on the position of the sensors 224 and cameras 222 about the advertising structure 12 such that linked sensors 224 and cameras 222 relate to the same predetermined area of the advertising structure 12. In other words, the cameras 222 that are positioned to capture certain areas surrounding the advertising structure 12 can be linked to the sensors 224 that are positioned to detect activity in those certain areas. For example, cameras 222 and sensors 224 positioned on the pole 14 of the advertising structure 12 can be linked such that the detection of movement at the pole 14 by sensors 224 can trigger the capturing of images around the pole 14 by the corresponding cameras 222 located at the pole 14. Similarly, the control data 56 can link warning devices 226, such as lights, to specific sensors 224 and/or cameras 222 based on the locations of the warning devices 226, sensors 224 and cameras 222 about the advertising structure 12. In one embodiment, the control data 56 can indicate that a light (warning device) 226 can be activated at the same time a camera 222 is activated such that the light (warning device) 226 provides sufficient illumination for the camera 222 to capture images of the area.

The control data 56 can indicate how long the one or more cameras 222 should be capturing images in response to a signal from sensor 224 or how many images the one or more cameras 222 should capture. In one embodiment, the control data 56 can indicate that one or more images should be captured by the one or more cameras 222. If multiple images are to be taken, the control data 56 can indicate the timing with which the images should be captured, e.g., 1 second between image captures. In another embodiment, the control data 56 can indicate that the one or more cameras 222 should capture video (i.e., a sequence of images) for a predetermined time period, e.g., 10 minutes, after the detection of activity by sensors 224. The control module 25 can use either clock 51 (see FIG. 5) or a separate counter (not shown) to determine the start and/or end of the predetermined time period. For each captured image, the control logic 33 stores a set of image data 52 defining the image, and the control logic 33 (see FIG. 5) timestamps the set of image data 52 to indicate, based on the clock 51, the time when the image is captured. When desired, the control logic 33 is configured to transmit one or more of the sets of image data 52 via the network transceiver 49 (see FIG. 5) and the network 50 to the server 63.

The control data 56 can also indicate when the control module 25 is to notify the server 63 of activity detected by sensors 224. In one embodiment, the server 63 can be notified by the control module 25 on each occurrence of detected activity by the sensors 224. However, in other embodiments, the notification of the server 63 by control module 25 can be based on a predetermined number of detections from sensors 224 (e.g., 3 detections) occurring within a predetermined time period (e.g., 15 seconds) to avoid providing "false positive" determinations to the server 63 that may result from the triggering of the sensor 224 by a bird or other animal passing within range of the sensor 224. The detection of multiple actions by sensors 224 in a short time frame can be indicative of deliberate actions (such as movement by a person) occurring around the sensors 224 as opposed to a random occurrence such as a bird passing by a sensor 224. In addition, if the control module 25 has image data from cameras 222, the control module 25 can include the image data with the notification of the detected activity. Based on the received notifications from the control module 25, the server 63 can determine when to notify a user of the detected activity from sensors 224. The server 63 can notify the user on each notification the server 63 receives from the control modules 25 or after a predetermined number of notifications.

The server logic 66 (see FIG. 6) of server 63 can notify the user by transmitting a message, e.g., an email or text (short message service (SMS)) message, to a predefined address, such as an email address or text number, associated with the user. The message sent to the user can include image data from cameras 222 along with the notification of activity. Thus, a user can become aware of detected activity shortly after its occurrence and can view (via the image data) the activity either in the message or by accessing the server 63 without having to travel to the location of the advertising structure 12. If necessary, the user may take corrective action in response to the activity, such as activating a warning device 226, notifying law enforcement personnel and/or deactivating equipment, e.g., light sources 19 and/or an electronic advertisement 15, at the advertising structure 12.

The control data 56 can also include information when the operation of security cameras 222 and/or sensors 224 should be deactivated or suspended so as to avoid having to process and/or respond to authorized or acknowledged activity at the advertising structure 12. For example, the operation of security cameras 222 and/or sensors 224 can be deactivated during scheduled maintenance around the advertising structure 12, which would involve authorized personnel working at or near the advertisement 15, or during severe weather events, which may have flying debris or precipitation that can trigger sensors 224, to avoid false or unnecessary reporting of activity at the advertising structure 12. In one embodiment, a user at the server 63 or at the user computing device 80 can enter instructions and/or information relating to which security cameras 222 and/or sensors 224 should be deactivated, how long the security cameras 222 and/or sensors 224 should be deactivated and/or when the security cameras 222 and/or sensors 224 should deactivated and/or reactivated. In another embodiment, the control data 56 can be automatically provided with maintenance data, which can include a maintenance schedule of when advertisements are scheduled to be changed at the advertising structure 12, from ad data 84 or elsewhere in memory 69. In still another embodiment, the sensors 224 and cameras 222 can remain active during authorized or acknowledged activity at the advertising structure 12 and the information stored in or provided to control data 56 regarding the authorized or acknowledged activity at the advertising structure 12 can be used by control logic 33 such that the control logic 33 either does not process the signals from the sensors 224 or does not take any responsive actions, e.g., capturing of images by cameras 222 or notifications to the server 63, upon receiving signals from the sensors 224.

For simplicity, FIG. 11 shows a single advertising structure 12, security camera 222, sensor 224, warning device 226 and control module 25, but the system 200 may have any number of advertising structures 12, security cameras 222, sensors 224, warning devices 226 and/or control modules 25 in other embodiments. The server 63 may be configured to communicate with any number of control modules 25 for monitoring any number of security cameras 222, sensors 224, warning devices 226 according to the techniques described herein.

In one exemplary embodiment, the advertising structure 12 is associated with an identifier, referred to herein as "structure identifier," that identifies the advertising structure 12 relative to other advertising structures 12 monitored by the system 200. In addition, each security camera 222 is associated with an identifier, referred to herein as "security identifier," that identifies such security camera 222 relative to other security cameras 222 in the system 200. Further, as shown by FIG. 6, the server 63 stores security data 230 that correlates the structure identifiers, security identifiers and the module identifiers. Specifically, the security data 230 correlates the structure identifier for a given advertising structure 12 with the security identifiers of the security cameras 222 monitoring the advertising structure 12 and the module identifiers of the control modules 25 associated with the advertising structure 12. The security data 230 can also include information on the users to be notified by the server 63 on the detection of activity by sensors 224 located at the advertising structure 12.

Each message transmitted to and received from a control module 25 relating to a security camera 222 can include the security identifier of such security camera 222. Thus, when the server logic 66 receives from control module 25 a set of image data 52 captured by camera 222, the server logic 66 can correlate such set of image data 52 with the appropriate structure identifier and security identifier. In this regard, using the security identifier in the received message, the server logic 66 looks up the correlated structure identifier in the security data 230 and associates the structure identifier and the security identifier with the set of image data 52. Thus, when sets of images of multiple advertising structures 12 or sets of images of multiple areas surrounding a particular advertising structure 12 are stored in memory 69 (see FIG. 6) at the server 63 or other location, the structure identifiers and security identifiers associated with the image data 52 can be used to find images of interest associated with the advertising structure 12 or a particular area surrounding the advertising structure 12. In particular, the structure identifier of advertising structure can be used as a key to lookup the set or sets of image data 52 pertaining to a particular advertising structure 12 of interest and the security identifier can be used as a key to lookup the set or sets of image data 52 pertaining to the capturing of images by a security camera 222 in a particular area surrounding the advertising structure.

If the user of the computing device 80 desires to view one or more images of areas surrounding the advertising structure 12, the user may establish a communication session with the server 63 via the network 50 and specify a structure identifier and/or security identifier pertaining to the area of interest around the advertising structure 12. Based on the identifiers selected by the user, the server logic 66 is configured to retrieve at least one set of image data 52 associated with the advertising structure 12 and to transmit the set(s) of image data 52 to the computing device 80, which may then render the set(s) of image data 52 to the user. In one embodiment, the user can filter the retrieved sets of retrieved image data 52 based on the date the image data 52 was captured and/or the time of day the image data 52 was captured. In another embodiment, the server logic 66 may automatically push the image data 52 to the user computing device 80 as part of a notification process resulting from the detection of activity by the sensors 224.

In one embodiment, when an electronic advertisement 15 is displayed by the advertising structure 12, the electronic advertisement 15 may be automatically deactivated in response to the detection of activity by sensors 224. Similarly, the light sources 19 in lighting fixture 16 for either a non-electronic or electronic advertisement 15 may be deactivated based on the detection of activity by sensors 224. The deactivation of the electronic advertisement 15 and/or light sources can be made to reduce the opportunity for an unauthorized person to vandalize or tamper with the advertisement 15 as described below.

Figure 13:
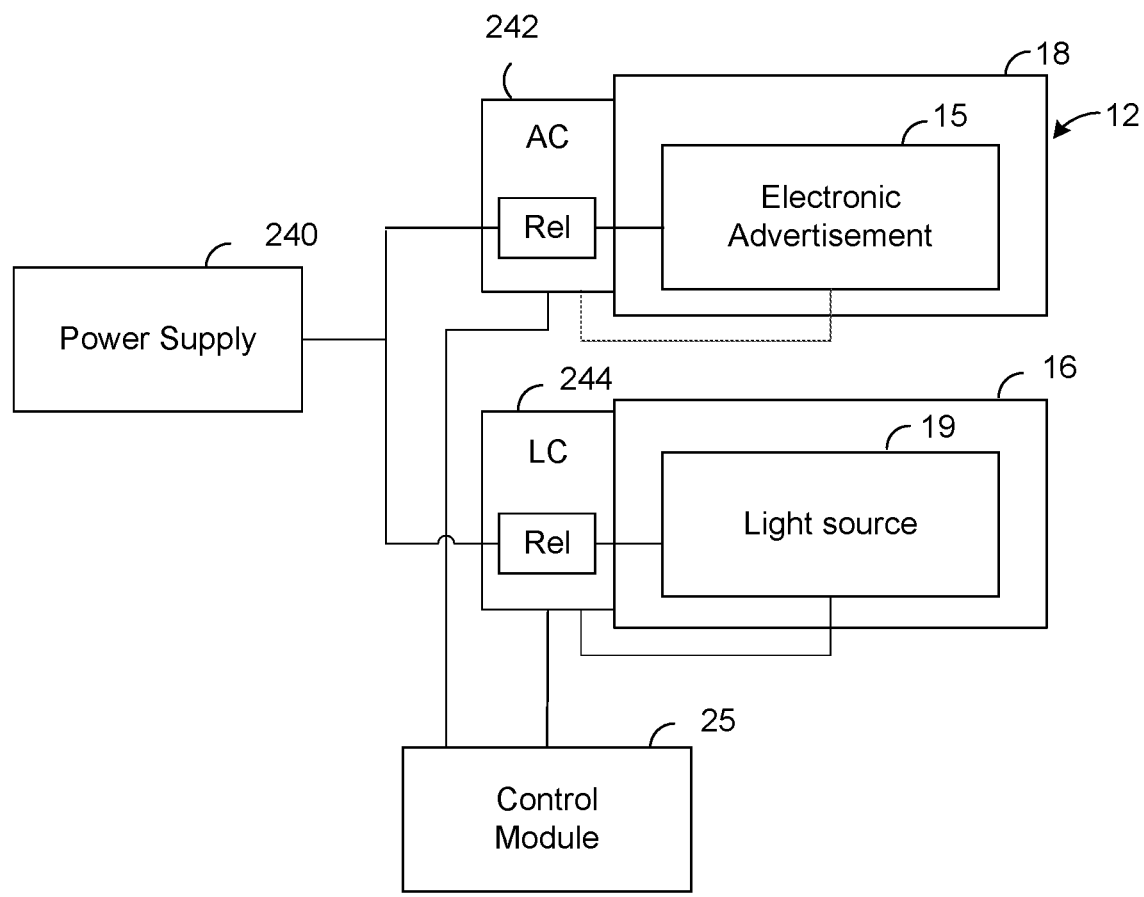
FIG. 13 is a block diagram illustrating an exemplary embodiment of connections between a control module and controllers for an advertisement and light source.

As shown in FIG. 13, the control module 25 can be connected to an advertising controller (AC) 242 and a lighting controller (LC) 244. The advertising controller 242 can be mounted on advertising structure 12 (or billboard 18) and coupled to electronic advertisement 15 to control the display of content by electronic advertisement 15. The advertising controller 242 can be used to provide power to the electronic advertisement 15 from power supply 240. The power from power supply 240 passes through a relay (Rel) in the advertising controller 242 before being provided to the electronic advertisement 15. The lighting controller 244 can be mounted on lighting fixture 16 and coupled to light source 19 to control the operation of light source 19, e.g., on/off control and brightness control. The lighting controller 244 can be used to provide power to the light source 19 from power supply 240. The power from power supply 240 passes through a relay (Rel) in the lighting controller 244 before being provided to the light source 19.

When the control module 25 is to deactivate the electronic advertisement 15 or the light source 19, the control module 25 can send a signal to either or both of the advertising controller 242 and lighting controller 244 to adjust (e.g., either open or close) the corresponding relay in order to disconnect the power to the electronic advertisement 15 and/or light source 19. In other embodiments, depending on how the power source 240 is coupled to the electronic advertisement 15 and light source 19, the relays controlling the supply of power to the electronic advertisement 15 and light source 19 may be located in other locations besides the advertising controller 242 and lighting controller 244. For example, the relays may be incorporated directly into the electronic advertisement 15 and light source 19 if the power supply 240 is directly coupled to the electronic advertisement 15 and light source 19. In another example, the relays may be incorporated in the control module 25 if the power supply 240 is coupled to the control module 25 and the electronic advertisement 15 and light source 19 receive power from the control module 25. In another embodiment, the control module 25 can deactivate the electronic advertisement 15 and/or light source 19 by sending "deactivation" commands to the advertising controller 242 (or the electronic advertisement 15) and/or the lighting controller 244 (or the light source 19) that result in the electronic advertisement 15 and/or light source 19 entering a deactivated state.

In other embodiments, the relays can be used to disconnect control instructions or data streams being provided to the electronic advertisement 15 or the light source 19 instead of power signals. For example, the electronic advertisement 15 can display advertisements based on a data stream provided to the advertising controller 242. The relay can be used to disconnect the data stream for the electronic advertisement 15 in response to an instruction from the control module 25 to thereby deactivate the electronic advertisement 15 since the content for the electronic advertisement 15 cannot be received by the electronic advertisement.

In one embodiment, the decision to deactivate the electronic advertisement 15 or the light sources 19 can be made in response to an "intruder event." An intruder event can be determined by control logic 33 based on a single detection of activity from a sensor 224, multiple detections of activity by sensors 224 within a predefined time period, or a detection of activity by a specific sensor 224, e.g., a sensor associated with an advertising controller 242 (see FIG. 13) for the electronic advertisement 15. In another embodiment, a determination of an intruder event can be made by control logic 33 in response to the detection of activity by multiple sensors 224 indicating a progression of movement toward the advertisement 15. In still other embodiments, the determination of an intruder event can be made by the server logic 66 or a combination of the control logic 33 and the server logic 66 that has some operations completed by the control logic 33 and other operations completed by the server logic 66.

To determine a progression of movement, the control logic 33 can use information on the location of the sensors 224 relative to the advertising structure 12 from security data 230 to generate possible access paths to the advertisement 15 for an unauthorized person. When the control logic 33 receives signals from the sensors 224, the control logic 33 can determine the location of the sensor 224 providing the signal and determine any access paths associated with that sensor. As further signals are received from the sensors 224, the control logic 33 can determine the location of the sensors 224 and any access paths associated with the sensors 224. The control logic 33 can then determine if one of the possible access paths is being used based on the timing of the signals received from the sensors 224, the location of the sensors 224 and the path information associated with the sensors 224. For example, if the control logic 33 receives a signal from a first sensor 224 on a possible access path followed by signals from the second sensor 224 and the third sensor 224 on the possible access path within a predetermined time period, e.g., 5-10 seconds, the control logic 33 can determine that a person is progressing toward the advertisement 15 since the sensors 224 on the possible access path are being triggered in sequence and within a short time frame. In another embodiment, the determination of a progression of movement can be made by the server logic 66 or a combination of the control logic 33 and the server logic 66 that has some operations completed by the control logic 33 and other operations completed by the server logic 66.

As an example, a detection of activity on the pole 14 of the advertising structure 12 followed by a detection of activity on the frame 13 of the advertising structure 12 within a predefined time period, e.g., 5 seconds or less, may indicate that a person has climbed the pole 14 and is on the frame 13 moving toward the advertisement 15. In still another embodiment, an intruder event can be determined by a user at the server 63 or the user computing device 80. The user can determine the intruder event by reviewing the image data from cameras 222 and identifying an unauthorized person in the vicinity of the advertisement 15. The user may then provide an input confirming or otherwise indicating that an intruder event has occurred.

Upon the detection of an intruder event, i.e., a person moving towards or in the vicinity of the advertisement 15, the electronic advertisement 15 or the light sources 19 can be deactivated by the control logic 33 to reduce the possibility of vandalism to the advertisement 15 or tampering with the electronic advertisement 15 to change the content that is displayed by the electronic advertisement 15. By deactivating the light source 19, if the intruder event occurs at night, the possibility of vandalism or tampering at the advertisement 15 can be reduced by reducing the visibility for the person at the advertisement 15 thereby limiting the person's ability to perform malicious actions due to low visibility. Similarly, by deactivating the electronic advertisement 15, a person may be prevented from tampering with the electronic advertisement 15 to cause an unauthorized display of content since the electronic advertisement is no longer being displayed. The control logic 33 can then communicate the appropriate instructions, e.g., commands to open a relay providing power to the electronic advertisement 15 or light sources 19, in order to deactivate the electronic advertisement 15 or the light sources 19. In another embodiment, the deactivation of the electronic advertisement 15 or the light sources 19 can be made by the server logic 66 or a combination of the control logic 33 and the server logic 66 that has some operations completed by the control logic 33 and other operations completed by the server logic 66. In still another embodiment, the user can provide the instruction to deactivate the electronic advertisement 15 or the light sources 19 at the computing device 80 or server 63 without having to indicate an intruder event.

In one embodiment, the control logic 33 of the control module 25 can be configured to determine when at least one light source 19 held by the fixture 16 or an electronic advertisement 15 is on or operating when the light source 19 or electronic advertisement 15 is not scheduled to be on or operating. The control logic 33 can determine the improper operation of the light source 19 or electronic advertisement 15 based on the control data 56 along with image data from cameras 22, 222 and/or sensor data from sensors 224, which can include light sensor 88. The control data 56 may define time periods that the at least one light source 19 or the electronic advertisement 15 are to be on. The control logic 33 can use information from clock 51 with the control data 56 to determine if the light source 19 or the electronic advertisement 15 is being operated at the appropriate times, which may indicate that the light sources 19 or electronic advertisement 15 have been tampered with by an unauthorized person. If the control logic 33 determines improper operation of the light source 19 or electronic advertisement 15, the control logic 33 can deactivate the light source 19 or electronic advertisement 15. In other embodiments, the server logic 66 or a user at the server 63 or user computing device 80 reviewing image data can determine the improper operation of the light source 19 or electronic advertisement 15 and provide an instruction to the control logic 33 to deactivate the light source 19 or the electronic advertisement 15.

In one embodiment, the control logic 33 can initiate operation of the light source 19 or electronic advertisement 15 at the next schedule time for operation after the deactivation of the light source 19 or electronic advertisement 15. In another embodiment, a user at either the server 63 or the user computing device 80 has to provide an instruction to the control logic 33 after being notified of the deactivation of the light source 19 or electronic advertisement 15 in order to activate the light source 19 or electronic advertisement 15 at the next scheduled time.

Figure 12:
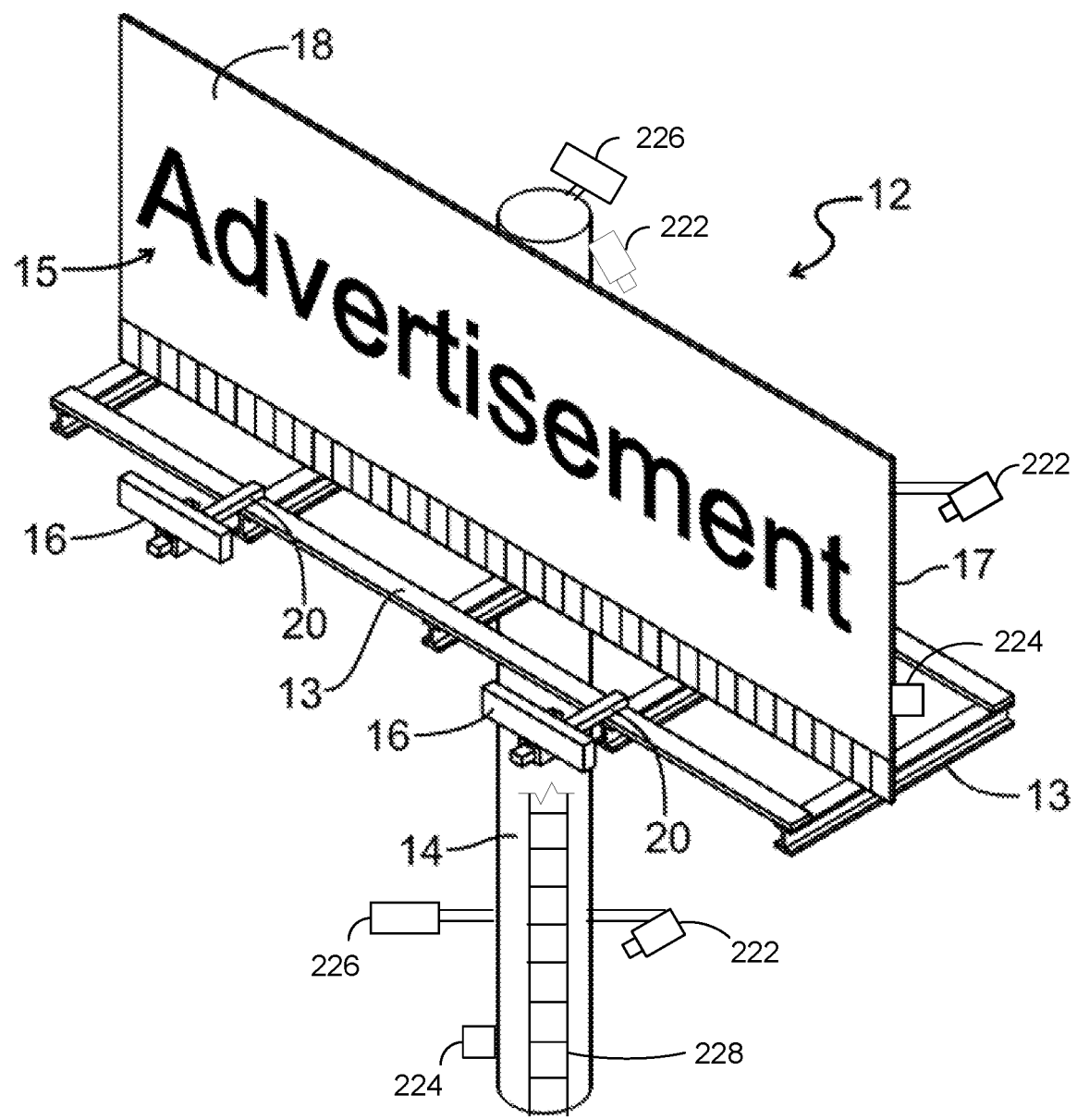
FIG. 12 is a perspective view illustrating an exemplary embodiment of an advertising system, such as is depicted by FIG. 11.

As shown by FIG. 12, the advertising structure 12 and billboard 18 can include three security cameras 222 (in addition to the cameras 22 incorporated into lighting fixtures 16 (see FIG. 4)), two sensors 224 and two warning devices 226. A sensor 224, security camera 222 and warning device 226 can be positioned at one location, such as on or near pole 14 to detect activities on or near a ladder 228 used to access the frame 13 and the panel 17. The other sensor 224, warning device 226 and security cameras 222 can be positioned at another location, such as on or near the top of the pole 14, panel 17 and/or frame 13 and used to detect activities occurring on the frame 13 and/or around the front and/or rear of panel 17. As shown in FIG. 12, cameras 22 and/or 222 mounted on frame 13 or panel 17 can be used to capture images of unauthorized people on the frame 13 at either the front or rear of the panel 17.

The security cameras 222 and sensors 224 can be used to monitor the areas around the billboard 18 and provide the information to control module 25. The sensors 224 can determine when movement or other activities are occurring around the billboard 18 and send signals to the control module 25 regarding the detected activity. For example, the sensors 224 can detect when a person is climbing ladder 228 on the pole 14 or walking on the frame 13. The control module 25 can then activate the cameras 222 to record or capture images of the activity detected by the sensors 224, e.g., the climbing of the pole 14 by the person or the walking on the frame 13 by the person, and send a notification to the server 63 regarding the detected activity. The server 63 can then send a notification to the user computing device 80 that activity has been detected at the billboard 18 and provide image data (if available) for the user. The user of the user computing device 80 can then view the image data captured by cameras 222 and decide if an intruder event has occurred and/or if additional action is required, e.g., deactivation of light sources 19 and/or electronic advertisement 15, notification of law enforcement or activation of warning devices 226.

The control module 25 can control the cameras 222 to monitor the area by capturing images and/or videos for a predetermined time period, e.g., a few seconds to a few hours (or more), after the detection of an event. In another embodiment, the control module 25 can control the cameras 222 to capture an image (photograph) of the area in response to the signal from sensors 224. The cameras 222 can then transmit the image(s) to the control module 25 for storage as image data 52 on the completion of the predetermined time period or at a predetermined interval or at another time established by the control module 25. The control module 25 can restart or start a new predetermined time period each time a signal from the sensor 224 is received.

In addition, if warning devices 226 are used, the control module 25 can activate the warning devices 226 in response to receiving the signal from sensors 224 or in response to a signal from the server 63 and/or user computing device 80 indicating the determination of an intruder event. In one embodiment, the control module 25 can make the determination regarding the activation of a warning device 226 based on the time of day the signal from the sensor 224 or the indication of the intruder event is received. For example, the control module 25 may not activate a light used as a warning device 226, if the signal from the sensor 224 is received during daylight hours. In another embodiment, the control module 25 can activate the warning device 226 after receiving a predetermined number of signals from the sensor 224. For example, the control module 25 may not activate the warning device 226 until three signals are received from the sensor 224 or multiple signals are received from multiple sensors 224 to avoid activating the warning device 226 on a "false positive" such as an animal travelling by the billboard 18.

In still another embodiment, the image processing logic 100 of the server 63 can determine an intruder event and/or make the decision to activate a warning device 226 based on the processing of the image data from the camera 222. For example, the image processing logic 100 can indicate an intruder event and/or activate the warning device 226 in response to the identification of a person in the image data from the camera 222 and a determination that the person is approaching the advertisement 15, e.g., determining that the unauthorized person is on the frame 13 or is scaling the ladder 228 on the pole 14.

In other embodiments, the security cameras 222, sensors 224 and control modules 25 can be used to monitor areas around other structures besides advertising structures 12. For example, the security cameras 222, sensors 224 and control modules 25 can be positioned at oil and gas tanks, athletic fields, water towers and/or any other remote structure that may be susceptible to unauthorized activity.

Now, therefore, the following is claimed:

1. An advertising structure monitoring system, comprising:
    an advertising structure having a billboard mounted on a pole, the billboard having one or more of an electronic advertisement or at least one light source directed toward an advertisement on the billboard for illuminating the advertisement, and the billboard further having a frame positioned to provide access to the one or more of the electronic advertisement or the at least one light source;
    a sensor coupled to the advertising structure and positioned to detect activity on the frame or a ladder positioned on the pole to provide access to the frame; and
    a control module having at least one processing element and programmed with instructions that, when executed by the at least one processing element, cause the control module to:
        detect an occurrence of an intruder event based on the activity detected by the sensor; and
        perform at least one action for deactivating one of the electronic advertisement or the at least one light source directed toward the advertisement on the billboard in response to detection of the intruder event.

2. The system of claim 1, wherein the instructions, when executed by the at least one processing element, cause the control module to deactivate the at least one light source directed toward the advertisement on the billboard in response to the detection of the intruder event.

3. The system of claim 1, wherein the instructions, when executed by the at least one processing element, cause the control module to deactivate the electronic advertisement in response to the detection of activity on the frame by the sensor.

4. The system of claim 1, wherein the instructions, when executed by the at least one processing element, cause the control module to control a device to provide an audio alert in response to the detection of the intruder event.

5. The system of claim 1, further comprising a camera coupled to the advertising structure, and wherein the instructions, when executed by the at least one processing element, cause the control module to control the camera to capture at least one image of the frame or the ladder in response to the detection of the intruder event and to transmit the at least one image to a user via a network.

6. The system of claim 5, further comprising a second light source positioned to illuminate an area viewed by the camera, wherein the instructions, when executed by the at least one processing element, cause the control module to activate the second light source in response to the detection of intruder event.

7. The system of claim 1, further comprising a camera coupled to the advertising structure, and wherein the instructions, when executed by the at least one processing element, cause the control module to control the camera to capture video images for a predetermined time period in response to the detection of the intruder event.

8. A monitoring system for an advertising structure, the monitoring system comprising:
    at least one sensor positioned at the advertising structure to detect activity in a predetermined area of the advertising structure;
    at least one camera positioned to capture a video of the predetermined area of the advertising structure; and
    a control module coupled to the at least one sensor and the at least one camera to communicate with the at least one sensor and the at least one camera, the control module comprising:
        a network transceiver for communicating with a network; and
        at least one first processing element, the control module programmed with first instructions that, when executed by the at least one first processing element, cause the control module to:
            activate the at least one camera in response to the detection of activity by the at least one sensor to capture video of the predetermined area of the advertising structure thereby defining video data;
            transmit the video data to a remote device via the network transceiver and the network; and
            receive a notification from the remote device via the network transceiver and network to implement a protective measure for the advertising structure, wherein the protective measure includes one or more of deactivating an electronic advertisement on the advertising structure or deactivating a light source directed toward an advertisement on the advertising structure and configured to illuminate the advertisement.

9. The system of claim 8, wherein the first instructions, when executed by the at least one first processing element, cause the control module to transmit the video data to the remote device in response to the at least one sensor detecting a plurality of activities within a predetermined time period.

10. The system of claim 8, further comprising a warning device to provide an alert at the predetermined area of the advertising structure, the warning device comprises one of a light, siren, alarm or speaker, and wherein the first instructions, when executed by the at least one first processing element, cause the control module to activate the warning device to provide the alert as the protective measure in response to the received notification from the remote device.

11. The system of claim 8, wherein the first instructions, when executed by the at least one first processing element, cause the control module to disconnect power to one or more of the electronic advertisement or the light source in response to receiving the notification from the remote device.

12. The system of claim 8, wherein the remote device is one of a server computer or a user computing device.

13. The system of claim 12, wherein the server computer has at least one second processing element and is programmed with second instructions that, when executed by the at least one second processing element, cause the server computer to execute image processing logic to process the video data in order to identify a person approaching the advertisement in the video data and to transmit the notification to the control module in response to identifying a person approaching the advertisement with the image processing logic.

14. The system of claim 12, wherein the server computer provides the video data to the user computing device, and the notification to implement the protective measure is provided by the user computing device in response to a user viewing the video data.

15. The system of claim 8, wherein the at least one sensor comprises a motion detector.

16. A method for monitoring an advertising structure comprising:
detecting activity at an area of the advertising structure with at least one sensor;
determining an occurrence of an intruder event with a control module based on the detected activity by the at least one sensor; and
implementing, with the control module, a responsive action in response to the determination of an occurrence of the intruder event, wherein the responsive action includes one or more of deactivating an electronic advertisement on the advertising structure or deactivating a light source directed toward an advertisement on the advertising structure and configured to illuminate the advertisement.

17. The method of claim 16, wherein implementing a responsive action includes activating a warning device with the control module in response to the determination of an occurrence of the intruder event, the warning device comprising at least one of a light, siren, alarm or speaker.

18. The method of claim 16, wherein:
the detecting activity at an area of the advertising structure includes detecting operation of at least one of the electronic advertisement or the light source; and
the determining an occurrence of the intruder event includes determining, with the control module, the intruder event in response to the detection of operation of the at least one of the electronic advertisement or the light source at an unauthorized time.

19. The method of claim 16, wherein the implementing a responsive action includes disconnecting power to at least one of the electronic advertisement or the light source.

20. The method of claim 16, further comprising:
automatically determining, with the control module, whether the detected activity by the at least one sensor is a scheduled activity; and
overriding, by the control module, an implementation of the responsive action in response to a determination that the detected activity is a scheduled activity.

21. The method of claim 16, wherein the determining an occurrence of the intruder event includes identifying, with the control module, a sequence of detected activity occurring in a plurality of areas of the advertising structure.

22. The method of claim 16, further comprising:
activating at least one camera with a control module in response to the detected activity by the at least one sensor, the at least one camera being positioned to capture image data of the area of the advertising structure associated with the detected activity by the at least one sensor; and
the determining an occurrence of the intruder event with the control module includes determining an occurrence of the intruder event based on the detected activity by the at least one sensor and the image data captured by the at least one camera.

23. The system of claim 3, wherein the instructions, when executed by the at least one processing element, cause the control module to disconnect power to the electronic advertisement to deactivate the electronic advertisement.

24. The system of claim 23, wherein the instructions, when executed by the at least one processing element, cause the control module to adjust a relay connected between a power supply and the electronic advertisement to disconnect power to the electronic advertisement.

25. The system of claim 1, wherein the instructions, when executed by the at least one processing element, cause the control module to:
transmit information relating to the activity detected by the sensor to a server computer;
receive a signal from the server computer indicating detection of the intruder event; and
deactivate one of the electronic advertisement or the at least one light source in response to the received signal from the server computer.

26. The system of claim 25, wherein the instructions, when executed by the at least one processing element, cause the control module to:
receive a second signal from the server computer after deactivating the one of the electronic advertisement or the at least one light source; and
activate the deactivated one of the electronic advertisement or the at least one light source in response to the received second signal from the server computer.

27. An advertising structure monitoring system, comprising:
an advertising structure having a billboard mounted on a pole, the billboard having an electronic advertisement and a frame positioned to provide access to the electronic advertisement;
a sensor coupled to the advertising structure and positioned to detect activity on the frame or activity on a ladder located on the pole that provides access to the frame; and
a control module having at least one processing element and programmed with instructions that, when executed by the at least one processing element, cause the control module to:
detect an occurrence of an intruder event based on the activity detected by the sensor; and perform at least one action for deactivating the electronic advertisement in response to detection of the intruder event.

28. The advertising structure monitoring system of claim 27, wherein the instructions, when executed by the at least one processing element, cause the control module to disconnect power to the electronic advertisement to deactivate the electronic advertisement.

29. The advertising structure monitoring system of claim 28, wherein the instructions, when executed by the at least one processing element, cause the control module to adjust a relay connected between a power supply and the electronic advertisement to disconnect power to the electronic advertisement.

30. The advertising structure monitoring system of claim 27, wherein the sensor comprises a motion detector.

* * * * *